US012695991B2

(12) United States Patent
Ethirajan et al.

(10) Patent No.: US 12,695,991 B2
(45) Date of Patent: Jul. 28, 2026

(54) AUTOMATED FOREIGN OBJECT DEBRIS DETECTION SYSTEM USING GENERATIVE AI

(71) Applicant: The Boeing Company, Arlington, VA (US)

(72) Inventors: Lakshmi Ethirajan, Bangalore (IN); Manoj Nath, Bangalore (IN); Sarin Kumar Thayyilsubramanian, Bangalore (IN)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/753,452

(22) Filed: Jun. 25, 2024

(65) Prior Publication Data

US 2025/0391184 A1     Dec. 25, 2025

(51) Int. Cl.
| | |
|---|---|
| *G06V 20/70* | (2022.01) |
| *G06F 40/40* | (2020.01) |
| *G06T 11/60* | (2026.01) |
| *G06V 10/764* | (2022.01) |
| *G06V 20/40* | (2022.01) |
| *G06V 20/52* | (2022.01) |
| *H04N 7/18* | (2006.01) |
| *H04N 23/695* | (2023.01) |

(52) U.S. Cl.
CPC .............. G06V 20/70 (2022.01); G06T 11/60 (2013.01); G06V 10/764 (2022.01); G06V 20/52 (2022.01); H04N 7/181 (2013.01); H04N 23/695 (2023.01); G06F 40/40 (2020.01); G06T 2200/24 (2013.01); G06V 20/40 (2022.01)

(58) Field of Classification Search
CPC ...... G06V 20/70; G06V 20/52; G06V 10/764; G06V 20/40; H04N 23/695; H04N 7/181; G06T 11/60; G06T 2200/24; G06F 40/40
USPC ........................................................ 348/159
See application file for complete search history.

(56) References Cited

U.S. PATENT DOCUMENTS

| | | | | |
|---|---|---|---|---|
| 10,606,904 | B2 * | 3/2020 | Musuluri ................. | G06F 16/94 |
| 2013/0329052 | A1 * | 12/2013 | Chew .................... | G06T 7/0008 |
| | | | | 348/159 |
| 2021/0110585 | A1 * | 4/2021 | Strong .................. | G06F 40/109 |
| 2021/0182713 | A1 * | 6/2021 | Kar ........................ | G06N 20/20 |

(Continued)

*Primary Examiner* — Thai Q Tran
*Assistant Examiner* — Nienru Yang
(74) *Attorney, Agent, or Firm* — Yee & Associates, P.C.

(57) ABSTRACT

Detecting foreign object debris (FOD) is provided. The method comprises receiving images captured by a number of imaging devices in a defined inspection area. A generative artificial intelligence (AI) model generates a natural language text caption describing the images. A text classifier AI model classifies FOD in the images based on the natural language text caption. An explainable AI model identifies words and phrases within the natural language text caption according to which the text classifier AI model made the classification. A report is displayed in a user interface, wherein for each identified FOD the report includes a location where the FOD was identified in the inspection area, the captured image with the natural language text caption, and highlighting of the key words and phrases identified by the explainable AI model. A generative AI translation model can then translate the report into a specified second language.

21 Claims, 11 Drawing Sheets

(56) References Cited

U.S. PATENT DOCUMENTS

| | | | | |
|---|---|---|---|---|
| 2023/0206661 A1* | 6/2023 | Choi | .......................... | G06N 3/09 |
| | | | | 382/156 |
| 2023/0339395 A1* | 10/2023 | Haynes | .................. | B60Q 9/008 |
| 2024/0152544 A1* | 5/2024 | Aykut | ..................... | G06F 16/45 |

* cited by examiner

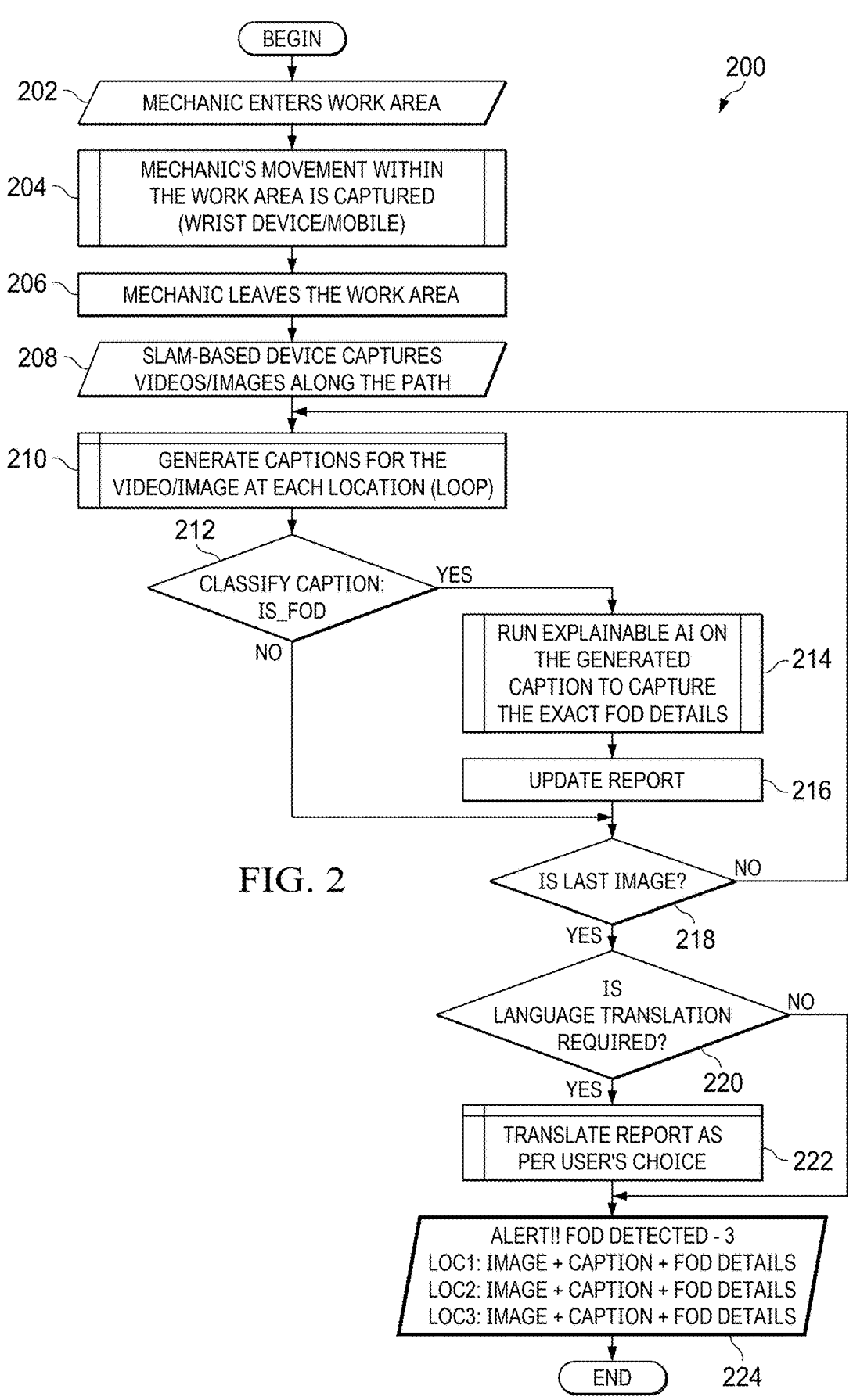

BEGIN

202 — MECHANIC ENTERS WORK AREA

200

204 — MECHANIC'S MOVEMENT WITHIN THE WORK AREA IS CAPTURED (WRIST DEVICE/MOBILE)

206 — MECHANIC LEAVES THE WORK AREA

208 — SLAM-BASED DEVICE CAPTURES VIDEOS/IMAGES ALONG THE PATH

210 — GENERATE CAPTIONS FOR THE VIDEO/IMAGE AT EACH LOCATION (LOOP)

212 — CLASSIFY CAPTION: IS_FOD

YES

NO

214 — RUN EXPLAINABLE AI ON THE GENERATED CAPTION TO CAPTURE THE EXACT FOD DETAILS

216 — UPDATE REPORT

FIG. 2

IS LAST IMAGE?

NO

YES

218

IS LANGUAGE TRANSLATION REQUIRED?

NO

YES

220

222 — TRANSLATE REPORT AS PER USER'S CHOICE

ALERT!! FOD DETECTED - 3
LOC1: IMAGE + CAPTION + FOD DETAILS
LOC2: IMAGE + CAPTION + FOD DETAILS
LOC3: IMAGE + CAPTION + FOD DETAILS

END        224

600

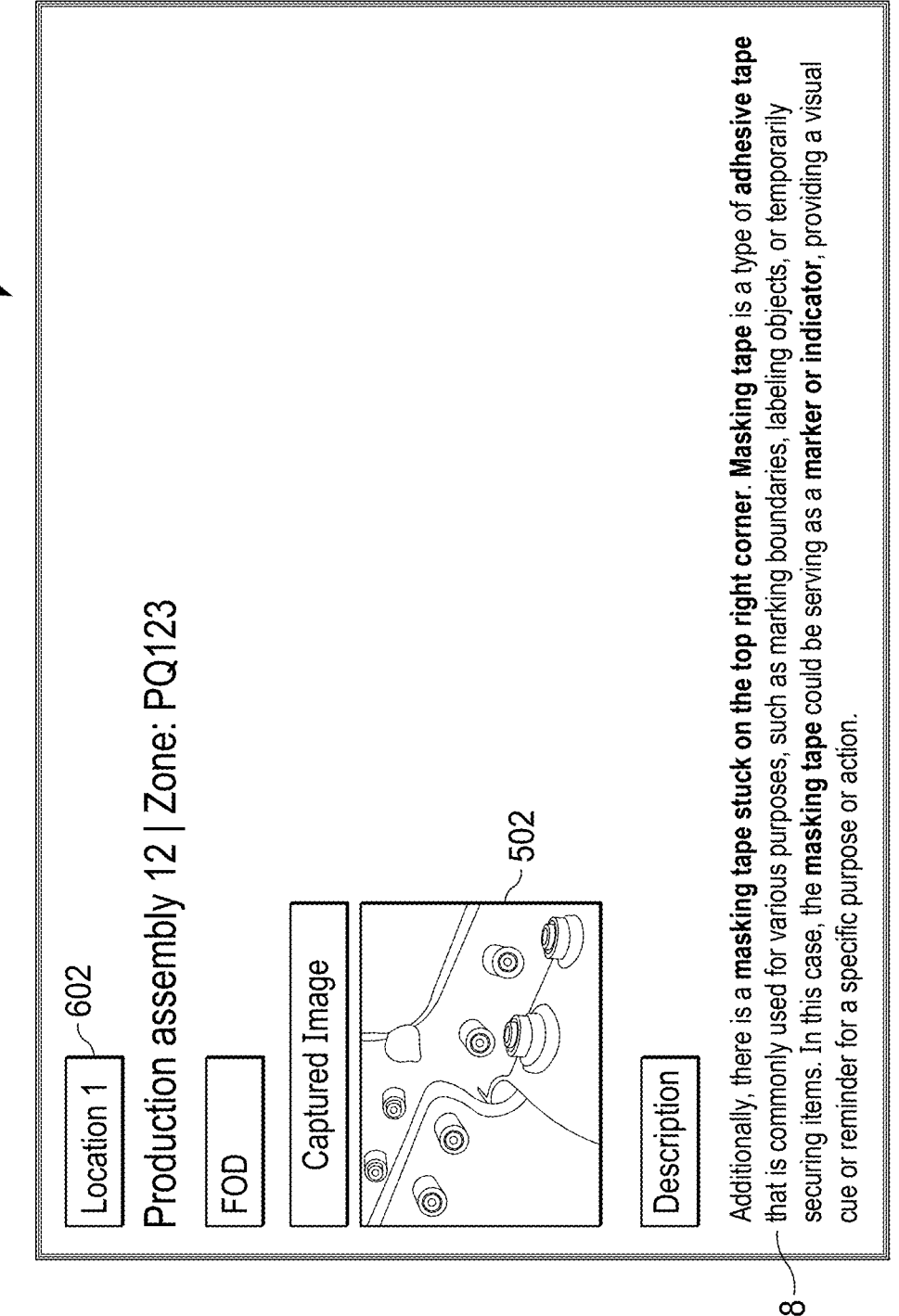

Location 1 — 602

Production assembly 12 | Zone: PQ123

FOD

Captured Image

502

Description

Additionally, there is a masking tape stuck on the top right corner. Masking tape is a type of adhesive tape that is commonly used for various purposes, such as marking boundaries, labeling objects, or temporarily securing items. In this case, the masking tape could be serving as a marker or indicator, providing a visual cue or reminder for a specific purpose or action.

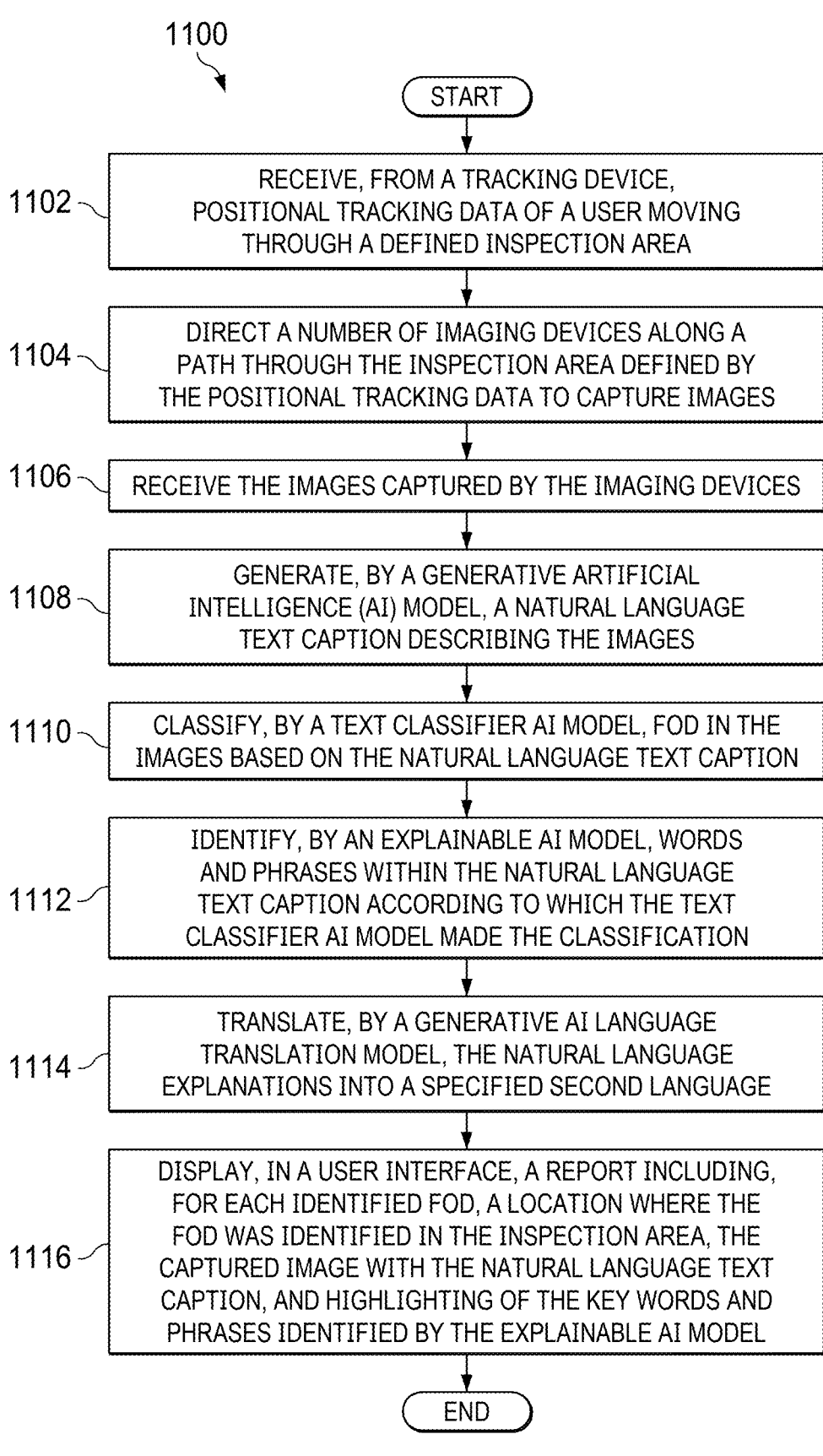

1100

START

1102 — RECEIVE, FROM A TRACKING DEVICE, POSITIONAL TRACKING DATA OF A USER MOVING THROUGH A DEFINED INSPECTION AREA

1104 — DIRECT A NUMBER OF IMAGING DEVICES ALONG A PATH THROUGH THE INSPECTION AREA DEFINED BY THE POSITIONAL TRACKING DATA TO CAPTURE IMAGES

1106 — RECEIVE THE IMAGES CAPTURED BY THE IMAGING DEVICES

1108 — GENERATE, BY A GENERATIVE ARTIFICIAL INTELLIGENCE (AI) MODEL, A NATURAL LANGUAGE TEXT CAPTION DESCRIBING THE IMAGES

1110 — CLASSIFY, BY A TEXT CLASSIFIER AI MODEL, FOD IN THE IMAGES BASED ON THE NATURAL LANGUAGE TEXT CAPTION

1112 — IDENTIFY, BY AN EXPLAINABLE AI MODEL, WORDS AND PHRASES WITHIN THE NATURAL LANGUAGE TEXT CAPTION ACCORDING TO WHICH THE TEXT CLASSIFIER AI MODEL MADE THE CLASSIFICATION

1114 — TRANSLATE, BY A GENERATIVE AI LANGUAGE TRANSLATION MODEL, THE NATURAL LANGUAGE EXPLANATIONS INTO A SPECIFIED SECOND LANGUAGE

1116 — DISPLAY, IN A USER INTERFACE, A REPORT INCLUDING, FOR EACH IDENTIFIED FOD, A LOCATION WHERE THE FOD WAS IDENTIFIED IN THE INSPECTION AREA, THE CAPTURED IMAGE WITH THE NATURAL LANGUAGE TEXT CAPTION, AND HIGHLIGHTING OF THE KEY WORDS AND PHRASES IDENTIFIED BY THE EXPLAINABLE AI MODEL

END

1302 — SPECIFICATION AND DESIGN

1304 — MATERIAL PROCUREMENT

1306 — COMPONENT AND SUBASSEMBLY MANUFACTURING

1308 — SYSTEM INTEGRATION

1310 — CERTIFICATION AND DELIVERY

1312 — IN SERVICE

1314 — MAINTENANCE AND SERVICE

1400

AIRCRAFT

1402 — AIRFRAME        INTERIOR — 1406

SYSTEMS

PROPULSION SYSTEM        ELECTRICAL SYSTEM 1408    1412        1410    1414

HYDRAULIC SYSTEM        ENVIRONMENTAL SYSTEM

1404

1

AUTOMATED FOREIGN OBJECT DEBRIS DETECTION SYSTEM USING GENERATIVE AI

BACKGROUND INFORMATION

Technical Field

The present disclosure relates generally to foreign object debris detection, and more specifically to detecting foreign object debris through AI analysis of captured images.

Background

Foreign Object Debris (FOD) is a major concern in the aerospace manufacturing domain. The presence of FOD can lead to several issues, including safety hazard risks, product defects, machinery damage, increased maintenance cost, regulatory compliance issues, or disruption in flight schedules. There are various techniques to detect FOD, like the use of image processing and computer vision, sound acoustics, FOD radar, Light Detection and Ranging (LiDAR) technology, and more. Most of the techniques either need a standard reference for comparison or do not have visual information.

SUMMARY

An illustrative embodiment provides a method for detecting foreign object debris (FOD). The method comprises receiving in images captured by a number of imaging devices in a defined inspection area. A generative artificial intelligence (AI) model generates a natural language text caption describing the images. A text classifier AI model classifies time FOD in the images based on the natural language text caption. An explainable AI model identifies words and phrases within the natural language text caption according to which the text classifier AI model made the classification. A report is displayed in a user interface, wherein for each identified FOD the report includes a location where the FOD was identified in the inspection area, the captured image with the natural language text caption, and highlighting of the key words and phrases identified by the explainable AI model.

Another illustrative embodiment provides a system for detecting foreign object debris (FOD). The system comprises a storage device that stores program instructions and one or more processors operably connected to the storage device and configured to execute the program instructions to cause the system to: receive images captured by a number of imaging devices in a defined inspection area; generate, by a generative artificial intelligence (AI) model, a natural language text caption describing the images; classify, by a text classifier AI model, FOD in the images based on the natural language text caption; identify, by an explainable AI model, words and phrases within the natural language text caption according to which the text classifier AI model made the classification; and display, in a user interface, a report including, for each identified FOD, a location where the FOD was identified in the inspection area, the captured image with the natural language text caption, and highlighting of the key words and phrases identified by the explainable AI model.

Another illustrative embodiment provides a computer program product for detecting foreign object debris (FOD). The computer program product comprises a computer-readable storage medium having program instructions embodied thereon to perform the operations of: receiving images captured by a number of imaging devices in a defined inspection area; generating, by a generative artificial intelligence (AI) model, a natural language text caption describing the images; classifying, by a text classifier AI model, FOD in the images based on the natural language text caption; identifying, by an explainable AI model, words and phrases within the natural language text caption according to which the text classifier AI model made the classification; and displaying, in a user interface, a report including, for each identified FOD, a location where the FOD was identified in the inspection area, the captured image with the natural language text caption, and highlighting of the key words and phrases identified by the explainable AI model.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

FIG. 2 depicts a flowchart illustrating an overview of an FOD detection method in accordance with an illustrative embodiment;

FIG. 6 depicts an example of a FOD report in accordance with an illustrative embodiment;

FIG. 11 depicts a flowchart illustrating a process for detecting foreign object debris (FOD) in accordance with an illustrative embodiment;

DETAILED DESCRIPTION

The illustrative embodiments recognize and take into account that the presence of FOD can lead to several issues, including safety hazard risks, product defects, machinery damage, increased maintenance cost, regulatory compliance issues, or disruption in flight schedules.

The illustrative embodiments also recognize and take into account that existing techniques for FOD detection require manual inspection of a location and manual checking of video/still images. Furthermore, current automated methods require a standard reference for comparison, and some techniques do not provide any visual information.

The illustrative embodiments also recognize and take into account that current FOD detection techniques also do not provide details in natural language for easier interpretation.

The illustrative embodiments provide an FOD detection system that leverages generative AI Image Captioning techniques to generate text captions for captured images. Further, machine learning algorithms analyze this text content to identify instances of FOD. The illustrative embodiments integrate an explainable AI model to offer a detailed understanding of the specific FOD location based on the text captions. This is further translated to the user's preferred language for easier interpretation.

The illustrative embodiments can detect unusual anomalies in the inspection area, such as a sticker on a pipe, a nut lying on the floor, oil spilled on the surface, loose strand of wire, stray plastic, cardboard or other unusual materials in the work zone and raise immediate alerts before it can cause further damage.

Figure 1:
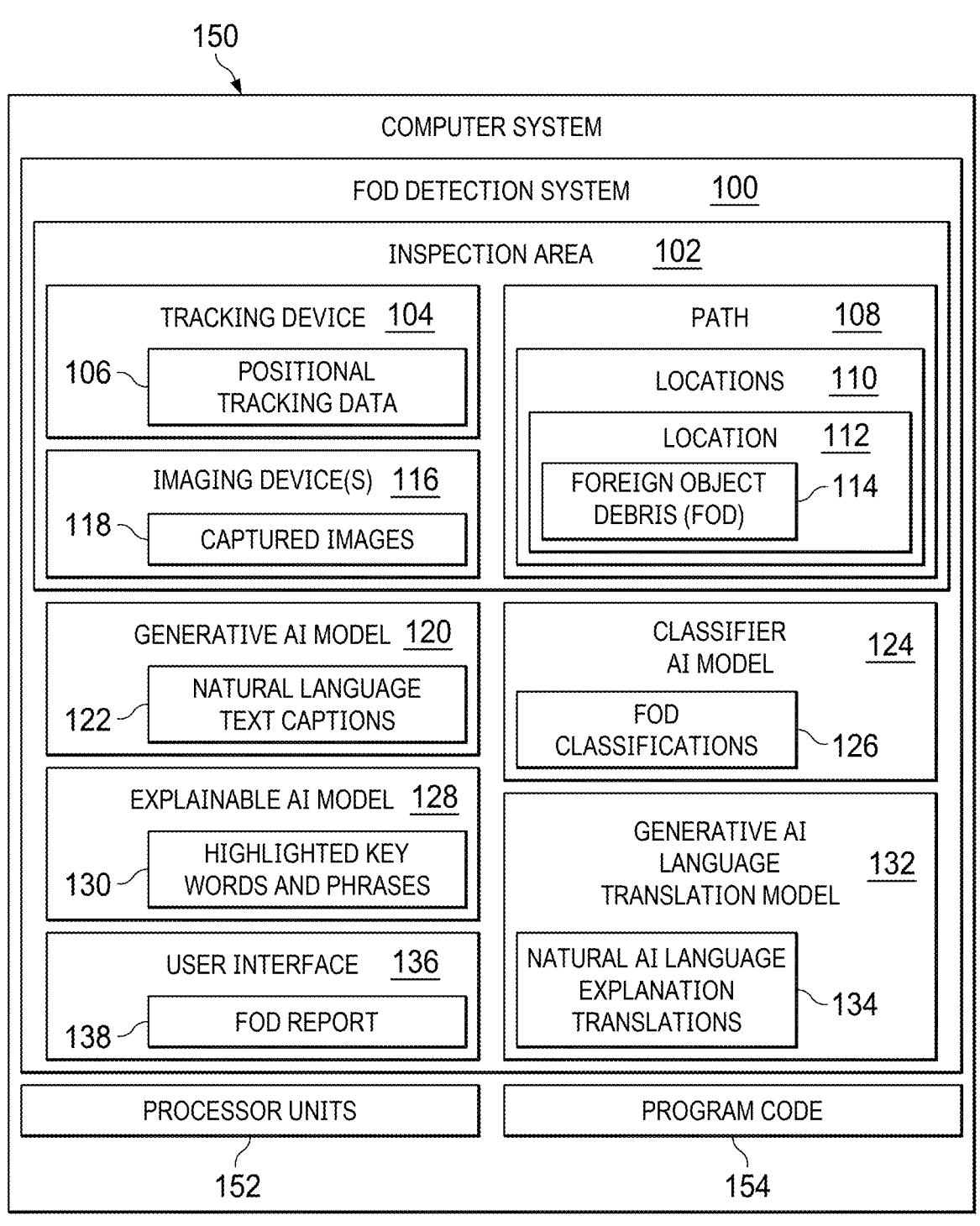
FIG. 1 depicts a block diagram of an FOD detection system in accordance with an illustrative embodiment.

FIG. 1 is a block diagram of an FOD detection system depicted in accordance with an illustrative embodiment. FOD detection system 100 operates with regard to an inspection area 102, which might be a manufacturing facility or other inspection facility used for maintenance, etc.

A tracking device 104 that is worn or carried by user such as a technician records positional tracking data as the user moves around and within the inspection area 102. This positional tracking data 106 is used to record a path 108 of the user's movements within the inspection area 102. (See FIG. 3).

After the user has left the area, one or more imaging devices 116 trace the path 108 taken by the user/technician to search for any foreign object debris (FOD) 114 that might have been inadvertently left behind by the user. (See FIG. 4). The imaging device(s) 116 might comprise a Simultaneous Localization and Mapping (SLAM) device, drones, static cameras, or a combination of them. The imaging device(s) 116 record captured images 118 as either still images and/or video of FOD 114 at various locations 110 along path 108. FOD detection system 100 notes the respective location 112 of each detected FOD 114.

The captured images 118 are fed into a generative artificial intelligence (AI) model 120 that generates natural text captions 122 which describe objects in the captured images in complete sentences. The natural language text captions 122 provide contextual information about the position and condition of objects in relation to their immediate surroundings in the captured images 118 for each location 112. (See FIG. 8). The natural language text captions 122 are fed into a classifier AI model 124 and an explainable AI (XAI) model 128. The classifier AI model 124 generates FOD classifications 126 for the objects in the captured images 118 based on the natural text captions 122 to determine whether or not the objects constitute FOD 114. The XAI model 128 highlights key words and phrases 130 according to which classifier AI model 124 makes its classification of FOD in the images. (See FIG. 6).

Optionally, a generative AI language translation model 132 can translate the natural language text captions 122 into another language (e.g., English to German, Italian to Japanese, etc.) to generate natural language explanation translations 134 according to preferences selected by the user.

FOD detection system 100 generates a FOD report 138 that is displayed in a user interface 136. FOD report 138 may include captured images 118 with accompanying text captions 122 with highlighted key words and phrases 130, FOD classifications 126, corresponding locations 110 for identified FOD 114. FOD report 138 might also contain natural language explanation translations 134. (See FIG. 6).

FOD detection system 100 can be implemented in software, hardware, firmware, or a combination thereof. When software is used, the operations performed by FOD detection system 100 can be implemented in program code configured to run on hardware, such as a processor unit. When firmware is used, the operations performed by FOD detection system 100 can be implemented in program code and data and stored in persistent memory to run on a processor unit. When hardware is employed, the hardware can include circuits that operate to perform the operations in FOD detection system 100.

In the illustrative examples, the hardware can take a form selected from at least one of a circuit system, an integrated circuit, an application specific integrated circuit (ASIC), a programmable logic device, or some other suitable type of hardware configured to perform a number of operations. With a programmable logic device, the device can be configured to perform the number of operations. The device can be reconfigured at a later time or can be permanently configured to perform the number of operations. Programmable logic devices include, for example, a programmable logic array, a programmable array logic, a field programmable logic array, a field programmable gate array, and other suitable hardware devices. Additionally, the processes can be implemented in organic components integrated with inorganic components and can be comprised entirely of organic components excluding a human being. For example, the processes can be implemented as circuits in organic semiconductors.

Computer system 150 is a physical hardware system and includes one or more data processing systems. When more than one data processing system is present in computer system 150, those data processing systems are in communication with each other using a communications medium. The communications medium can be a network. The data processing systems can be selected from at least one of a computer, a server computer, a mobile device such as a tablet computer, or some other suitable data processing system.

As depicted, computer system 150 includes a number of processor units 152 that are capable of executing program code 154 implementing processes in the illustrative examples. As used herein, a processor unit in the number of processor units 152 is a hardware device and is comprised of hardware circuits such as those on an integrated circuit that respond and process instructions and program code that operate a computer. When a number of processor units 152 execute program code 154 for a process, the number of processor units 152 is one or more processor units that can be on the same computer or on different computers. In other words, the process can be distributed between processor units on the same or different computers in a computer system. Further, the number of processor units 152 can be of the same type or different type of processor units. For example, a number of processor units can be selected from at least one of a single core processor, a dual-core processor, a multi-processor core, a general-purpose central processing unit (CPU), a graphics processing unit (GPU), a digital signal processor (DSP), or some other type of processor unit.

FIG. 2 depicts a flowchart illustrating an overview of an FOD detection method in accordance with an illustrative embodiment. Process 200 begins with a mechanic or similar type of personnel entering a manufacturing or inspection area to address some issue (operation 202). This person's movements within the defined area are tracked, which might be done with a wearable or handheld device such as, e.g., a wrist tracker, smart watch, mobile device, etc., that is worn or held by the person in question (operation 204). (See FIG. 3). In this manner, the person's path of movement through the area is detected and recorded.

Figure 4:
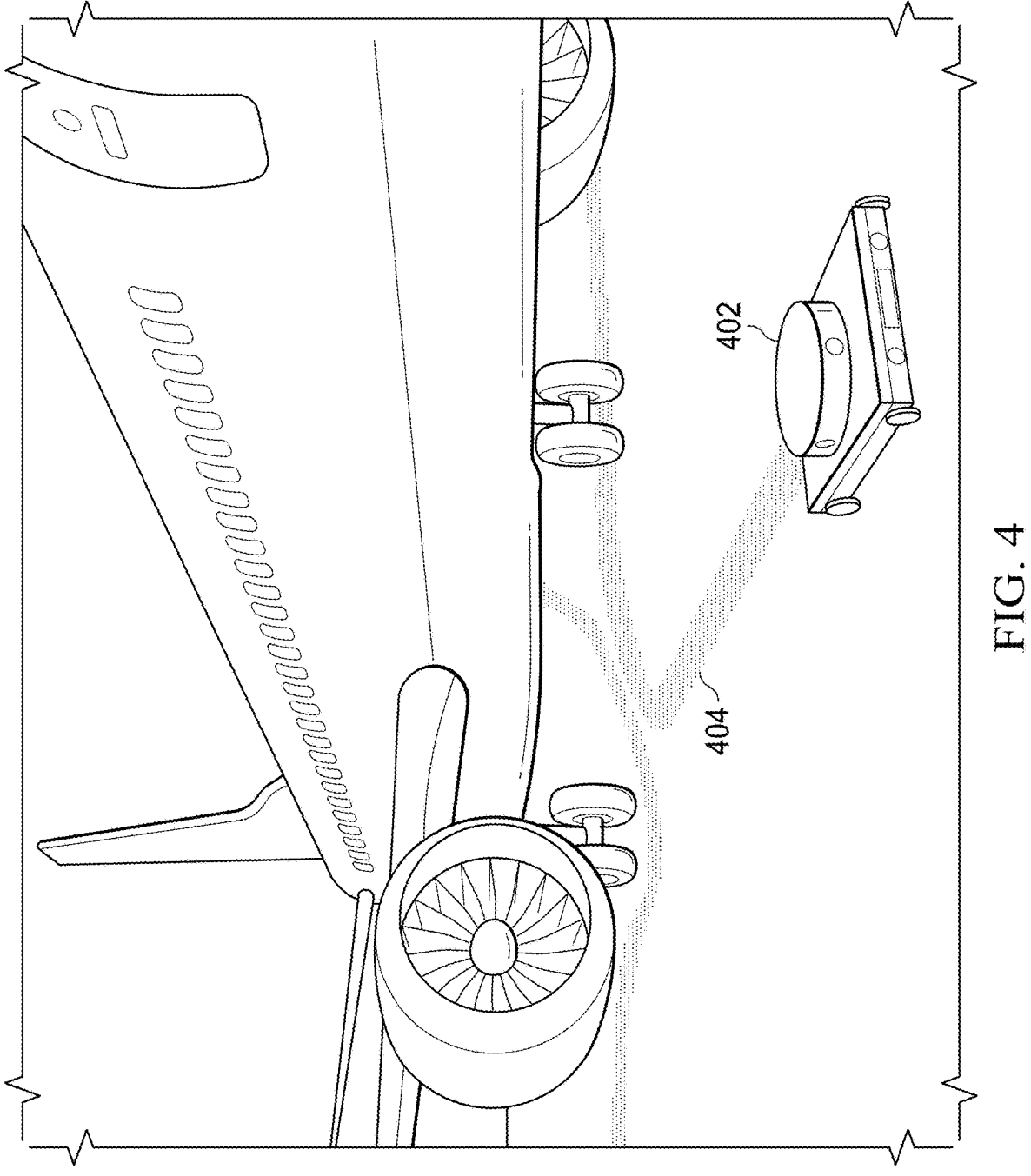
FIG. 4 depicts an illustration of a SLAM device inspecting areas visited by a technician in a manufacturing or inspection area in accordance with an illustrative embodiment.

After the person leaves the area (operation 206), an imaging device inspects the areas visited by the person according to the recorded path (see FIG. 4). This imaging device or devices might comprise a SLAM device, drones, static cameras, etc., or a combination of such. The imaging device(s) captures multiple images and/or video along the path traveled by the mechanic (operation 208).

Generative artificial intelligence (AI) generates captions for the captured images and video (operation 210). Captions at each location are processed through a machine learning natural language processing (NLP) classification model, which determines whether or not the input text produced by the generative AI contains FOD (operation 212). The captions are passed through explainable artificial intelligence (XAI) models to explain why the model has flagged the text as containing FOD (operation 214), and the report is updated accordingly (operation 216).

After determining if all images have been processed (operation 218), process 200 then determines whether a language translation is required (operation 220).

The report can be translated into any preferred language accordingly for the benefit of the user in question (operation 222).

A comprehensive report is generated indicating the exact location of the FOD(s) along with the visuals and details in natural language text (operation 224).

Figure 3:
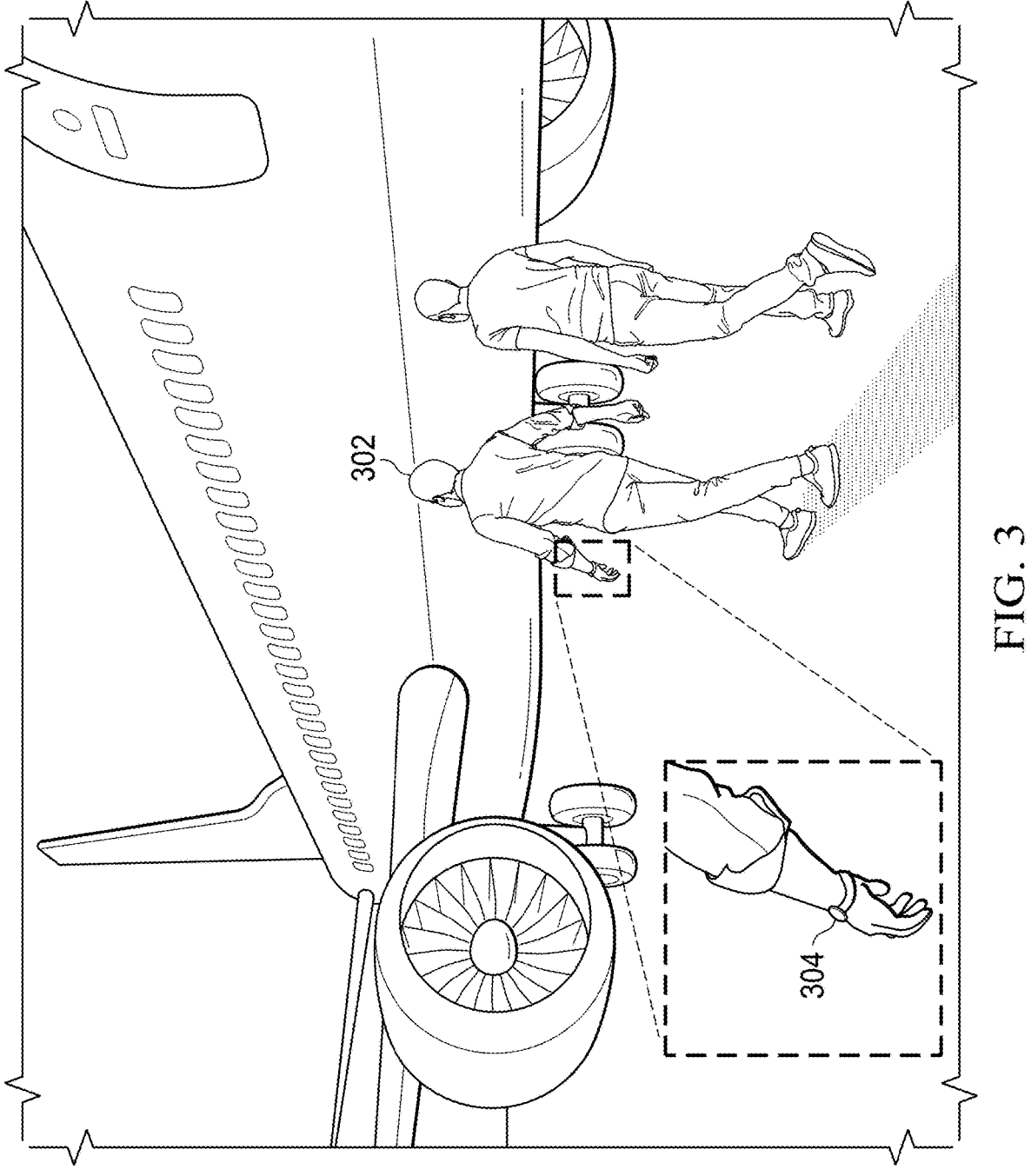
FIG. 3 depicts an illustration of a technician walking through a manufacturing or inspection area in accordance with an illustrative embodiment.

FIG. 3 depicts an illustration of a technician 302 walking through a manufacturing or inspection area in accordance with an illustrative embodiment. In this example, the technician 302 is wearing a wrist tracker 304, which allows recording of the technician's movement through the area in question.

FIG. 4 depicts an illustration of a SLAM device inspecting areas visited by a technician in a manufacturing or inspection area in accordance with an illustrative embodiment. The SLAM device 402 follows the technician's path 404 that was previously recorded using the wrist tracker 304 or other portable device. As explained above, other imaging devices sch as drones or static cameras might be used in place of or in addition to the SLAM device 402.

Figure 5:
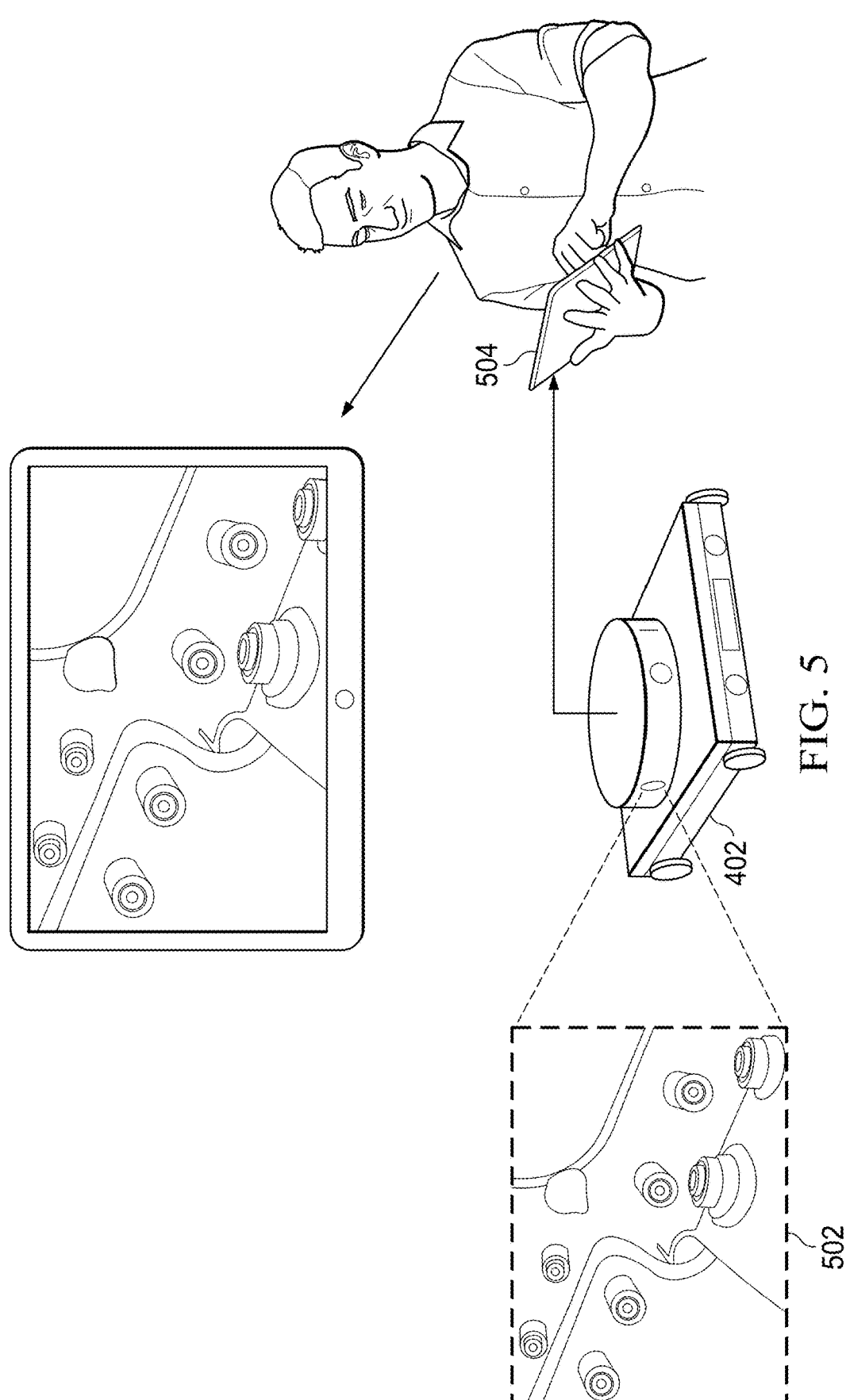
FIG. 5 depicts an example FOD image captured by an imaging device in accordance with an illustrative embodiment.

FIG. 5 depicts an example FOD image captured by an imaging device in accordance with an illustrative embodiment. The SLAM device 402 captures an image/video 502 and sends the image in either in real time or offline to an application in a smart device 504 such as, e.g., a tablet computer. As shown, the displayed image in the smart device 504 can generate text captions.

FIG. 6 depicts an example of a FOD report in accordance with an illustrative embodiment. The application in the smart device 504 processes the image/video and generates a comprehensive FOD report 600 in real time or offline in the user's preferred language.

In the present example, the FOD report 600 specifies a location 602 in the inspection area where the FOD in question was located. FOD report 600 includes the captured image 502 of the area containing the FOD.

FOD report 600 also includes a description 608 of what was found by the imaging device upon inspection at location 602. The description 608 is generated by a generative AI image captioning model and may include color coded highlighting of key words and phrases generated by an explainable AI (XAI) model according to and criticality (described below). FOD report 600 can be generated in real time or offline. In the present example, the terms and phrases "masking tape stuck on the top right corner," "masking tape," and "adhesive tape" are highlighted differently than "marker or indicator" to emphasize that they represent more of a potential problem.

Figure 7:
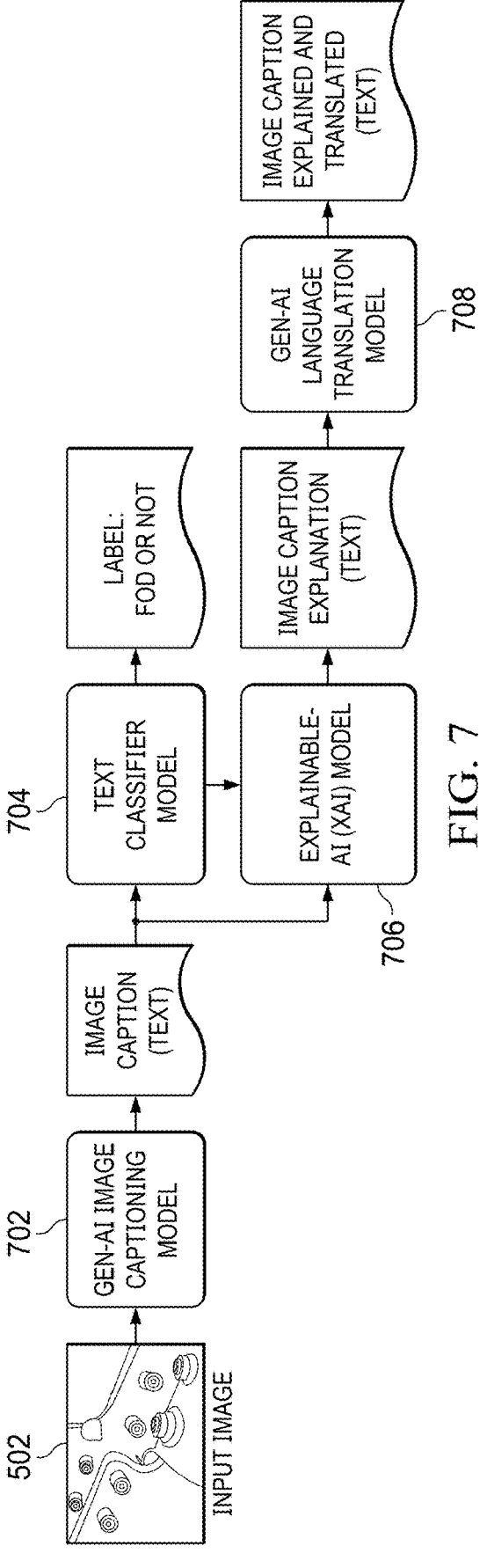
FIG. 7 depicts a process flow for machine learning and AI models for generating FOD descriptions in accordance with the illustrative embodiments.

FIG. 7 depicts a process flow for machine learning and AI models for generating FOD descriptions in accordance with the illustrative embodiments. The steps of the process flow may be performed in real time, offline, or a combination of the two. A pre-trained generative AI model 702 receives an input image and generates image captions.

The image captions are then concurrently fed into a natural language processing (NLP) text classifier model 704 and XAI model 706. The NLP text classifier model 704 determines whether or not there is an FOD in the image. The XAI mode 706 generates an explanation of the prediction generated by the NLP text classifier model 704 to highlight the keywords in the image caption generated by the generative AI model 702, e.g., description 608 in FIG. 6.

The image caption explanation can then be fed into a generative AI language translation model 708, which translates the text of the report to the preferred language of a user (e.g., German, French, etc.). The generative AI language translation model 708 might comprise one or more large language models (LLMs).

Figure 8:
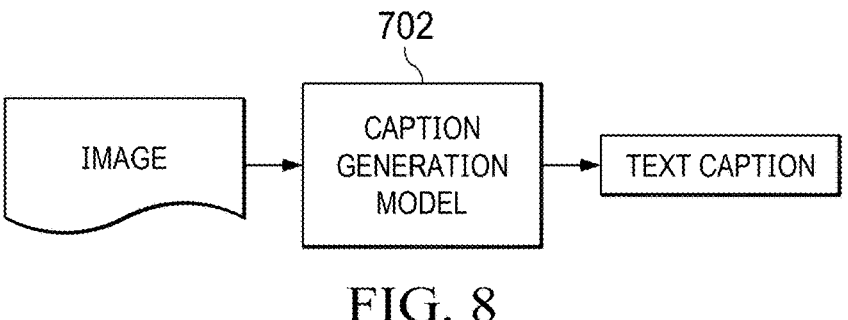
FIG. 8 depicts a detailed view of generative AI model for text caption generation in accordance with an illustrative embodiment.

FIG. 8 depicts a detailed view of generative AI model 702 for text caption generation. The image-to-text generation might be based on attention-based deep learning models or comparable models that assign a level of importance ("attention") to different parts of the image data. The model generates natural language textual explanations for the images. For example, the text explanation might be, "There is white electrical piping hanging from the ceiling and extending downwards, with a masking sticker placed on the upper section of the piping."

Figure 9:
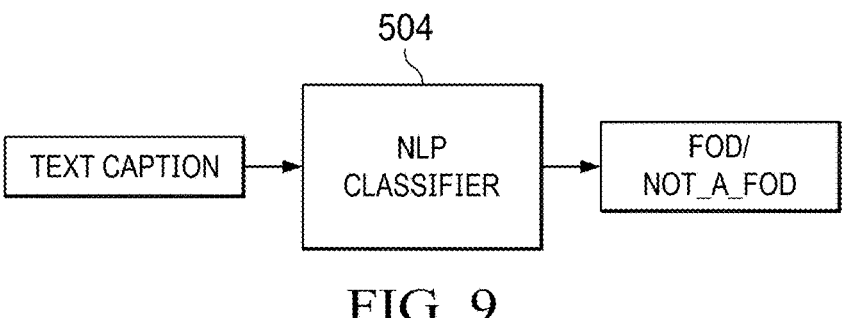
FIG. 9 depicts a detailed view of an NLP classifier model in accordance with an illustrative embodiment.

FIG. 9 depicts a detailed view of NLP classifier model 704. The NLP text classifier model 704 determines whether or not there is an FOD in the image based on the image caption. The model is a binary, NLP-based text classifier that makes a yes/no classification with an associated confidence score above a set threshold. Using the example above, the classifier 704 might determine that the masking sticker on the upper section of the piping is FOD with 84% confidence. Examples of FOD text that could raise an alert include screwdriver, dust particles, loose wire, flakes of paint, unconnected bolts, fragments of metal, fluid, sticker tape.

Figure 10:
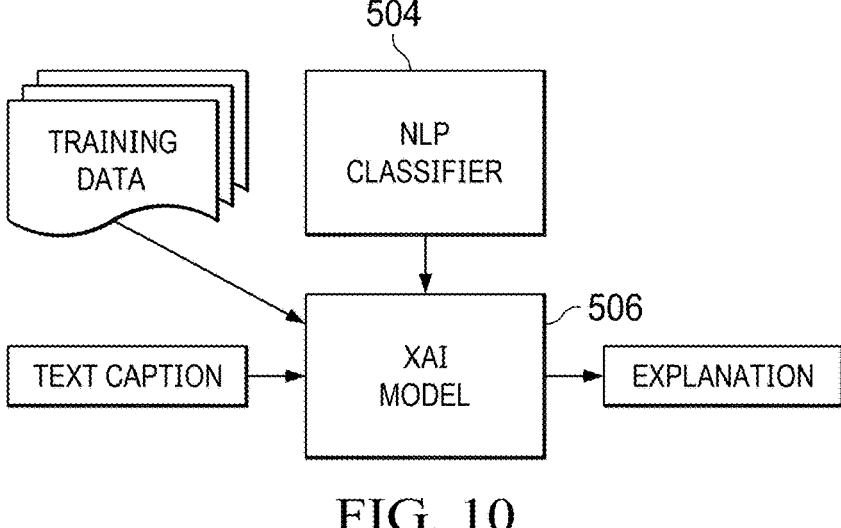
FIG. 10 depicts a detailed view of an XAI model in accordance with an illustrative embodiment.

FIG. 10 depicts a detailed view of XAI model 706. XAI model 706 receives as input the image caption generated by the generative AI model 702 as well as input of the determination made by NLP classifier model 704 as to whether the image caption indicates the presence of FOD. The XAI model 706 explains why a particular prediction was made by the NLP classifier model 704. XAI model 706 might also employ NLP to produce its explanation text. Examples of XAI models include SHapley Additive explanations (SHAP) and Local Interpretable Model Agnostic Explanation (LIME).

Continuing the example used above, the XAI model 706 might highlight the words "masking sticker" in the image caption as well as the word "hanging." Furthermore, "hanging" might receive a different highlight indicating is a more serious potential problem.

FIG. 11 depicts a flowchart illustrating a process for detecting foreign object debris (FOD) in accordance with an illustrative embodiment. Process 1100 can be implemented in FOD detection system 100 in FIG. 1. The operations in process 1100 can be performed in real time, offline, or a combination thereof.

Process 1100 begins by receiving, from a tracking device, positional tracking data of a user moving through a defined inspection area (operation 1102). The tracking device might comprise one of a wrist tracker, a smart watch, or a handheld mobile device.

Process 1100 then directs a number of imaging devices along a path through the inspection area defined by the positional tracking data to capture images (operation 1104). The imaging devices comprises at least one of Simultaneous Localization and Mapping (SLAM) devices, drones, or static cameras. The images might be still images or video.

Process 1100 receives the images captured by the imaging devices in the defined inspection area (operation 1106). Process 1100 generates, by a generative artificial intelligence (AI) model, a natural language text caption describing the images (operation 1108).

Process 1100 classifies, by a text classifier AI model, FOD in the images based on the natural language text caption (operation 1110) and then identifies, by an explainable AI model, words and phrases within the natural language text caption according to which the text classifier AI model made the classification (operation 1112). The explainable AI model might comprise, e.g., a SHapley Additive explanations (SHAP) and/or Local Interpretable Model Agnostic Explanation (LIME), tree surrogates, Global Interpretation via Recursive Partitioning (GIRP), Explainable Boosting Machine (EBM), Contrastive Explanation Method (CEM), or any NLP explainable AI model.

Process 1100 may also translate, by a generative AI language translation model, the natural language explanations into a specified second language such as, e.g., French, German, etc. (operation 1116).

Process 1100 displays, in a user interface, a report including, for each identified FOD, a location where the FOD was identified in the inspection area, the captured image with the natural language text caption, and highlighting of the key words and phrases identified by the explainable AI model (operation 1118). Process 1100 then ends.

Figure 12:
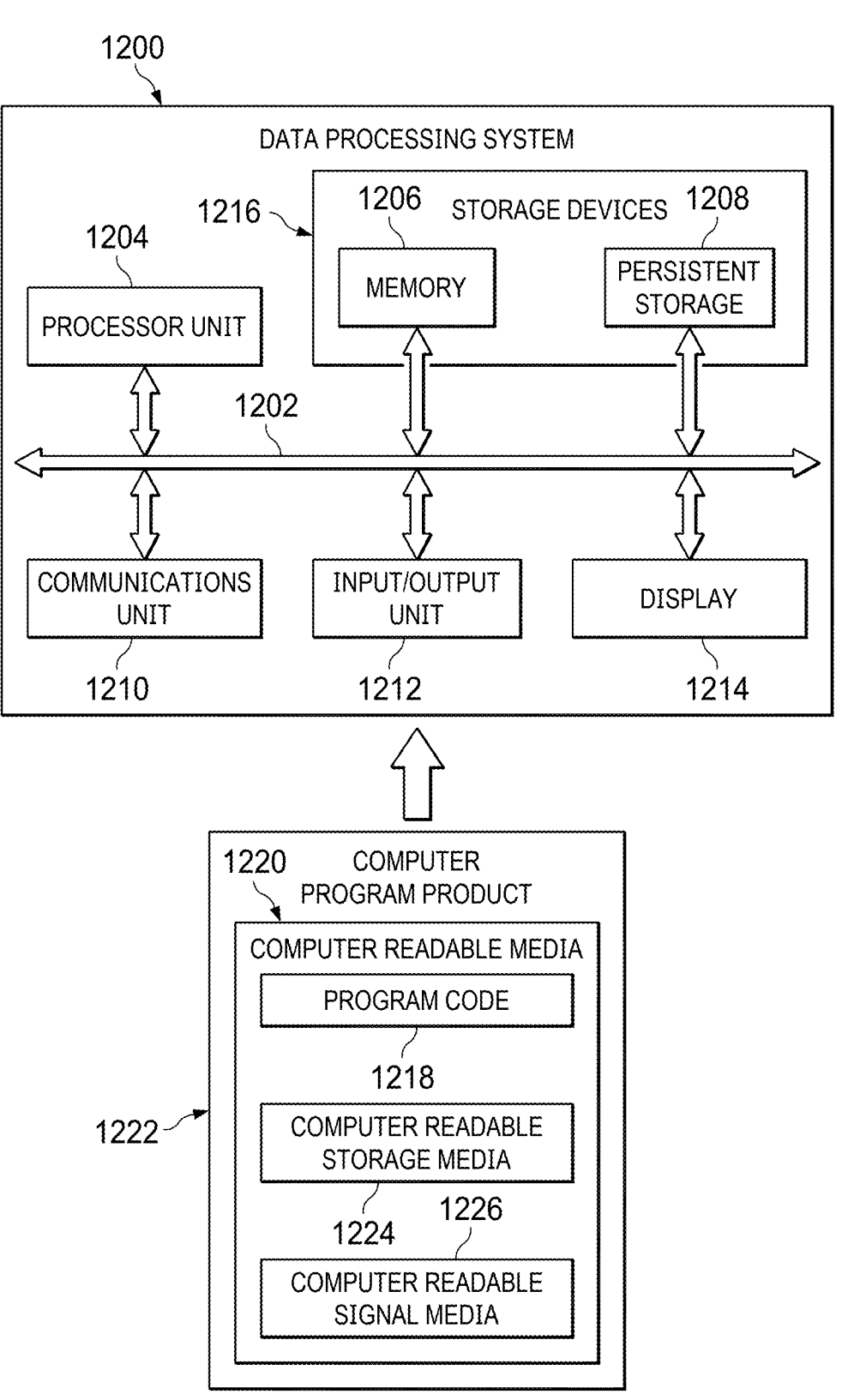
FIG. 12 is an illustration of a block diagram of a data processing system in accordance with an illustrative embodiment.

Turning now to FIG. 12, an illustration of a block diagram of a data processing system is depicted in accordance with an illustrative embodiment. Data processing system 1200 may be used to implement computer system 150 in FIG. 1. In this illustrative example, data processing system 1200 includes communications framework 1202, which provides communications between processor unit 1204, memory 1206, persistent storage 1208, communications unit 1210, input/output (I/O) unit 1212, and display 1214. In this example, communications framework 1202 takes the form of a bus system.

Processor unit 1204 serves to execute instructions for software that may be loaded into memory 1206. Processor unit 1204 may be a number of processors, a multi-processor core, or some other type of processor, depending on the particular implementation. In an embodiment, processor unit 1204 comprises one or more conventional general-purpose central processing units (CPUs). In an alternate embodiment, processor unit 1204 comprises one or more graphical processing units (GPUS).

Memory 1206 and persistent storage 1208 are examples of storage devices 1216. A storage device is any piece of hardware that is capable of storing information, such as, for example, without limitation, at least one of data, program code in functional form, or other suitable information either on a temporary basis, a permanent basis, or both on a temporary basis and a permanent basis. Storage devices 1216 may also be referred to as computer-readable storage devices in these illustrative examples. Memory 1206, in these examples, may be, for example, a random access memory or any other suitable volatile or non-volatile storage device. Persistent storage 1208 may take various forms, depending on the particular implementation.

For example, persistent storage 1208 may contain one or more components or devices. For example, persistent storage 1208 may be a hard drive, a flash memory, a rewritable optical disk, a rewritable magnetic tape, or some combination of the above. The media used by persistent storage 1208 also may be removable. For example, a removable hard drive may be used for persistent storage 1208. Communications unit 1210, in these illustrative examples, provides for communications with other data processing systems or devices. In these illustrative examples, communications unit 1210 is a network interface card.

Input/output unit 1212 allows for input and output of data with other devices that may be connected to data processing system 1200. For example, input/output unit 1212 may provide a connection for user input through at least one of a keyboard, a mouse, or some other suitable input device. Further, input/output unit 1212 may send output to a printer. Display 1214 provides a mechanism to display information to a user.

Instructions for at least one of the operating system, applications, or programs may be located in storage devices 1216, which are in communication with processor unit 1204 through communications framework 1202. The processes of the different embodiments may be performed by processor unit 1204 using computer-implemented instructions, which may be located in a memory, such as memory 1206.

These instructions are referred to as program code, computer-usable program code, or computer-readable program code that may be read and executed by a processor in processor unit 1204. The program code in the different embodiments may be embodied on different physical or computer-readable storage media, such as memory 1206 or persistent storage 1208.

Program code 1218 is located in a functional form on computer-readable media 1220 that is selectively removable and may be loaded onto or transferred to data processing system 1200 for execution by processor unit 1204. Program code 1218 and computer-readable media 1220 form computer program product 1222 in these illustrative examples. In one example, computer-readable media 1220 may be computer-readable storage media 1224 or computer-readable signal media 1226.

In these illustrative examples, computer-readable storage media 1224 is a physical or tangible storage device used to store program code 1218 rather than a medium that propagates or transmits program code 1218. Computer readable storage media 1224, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Alternatively, program code 1218 may be transferred to data processing system 1200 using computer-readable signal media 1226. Computer-readable signal media 1226 may be, for example, a propagated data signal containing program code 1218. For example, computer-readable signal media 1226 may be at least one of an electromagnetic signal, an optical signal, or any other suitable type of signal. These signals may be transmitted over at least one of communications links, such as wireless communications links, optical fiber cable, coaxial cable, a wire, or any other suitable type of communications link.

The different components illustrated for data processing system 1200 are not meant to provide architectural limitations to the manner in which different embodiments may be implemented. The different illustrative embodiments may be implemented in a data processing system including components in addition to or in place of those illustrated for data processing system 1200. Other components shown in FIG. 12 can be varied from the illustrative examples shown. The different embodiments may be implemented using any hardware device or system capable of running program code 1218.

Figure 13:
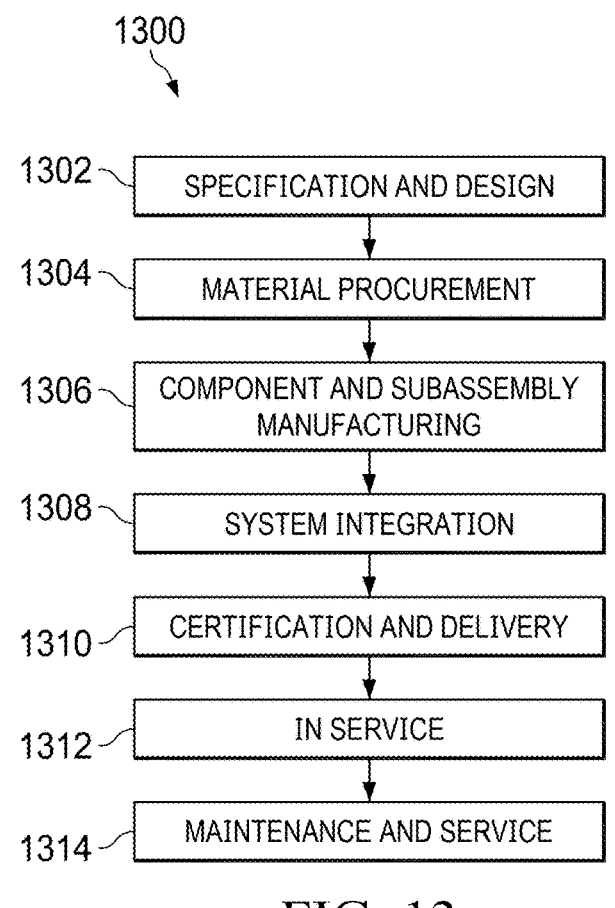
FIG. 13 is an illustration of an aircraft manufacturing and service method in accordance with an illustrative embodiment.
Figure 14:
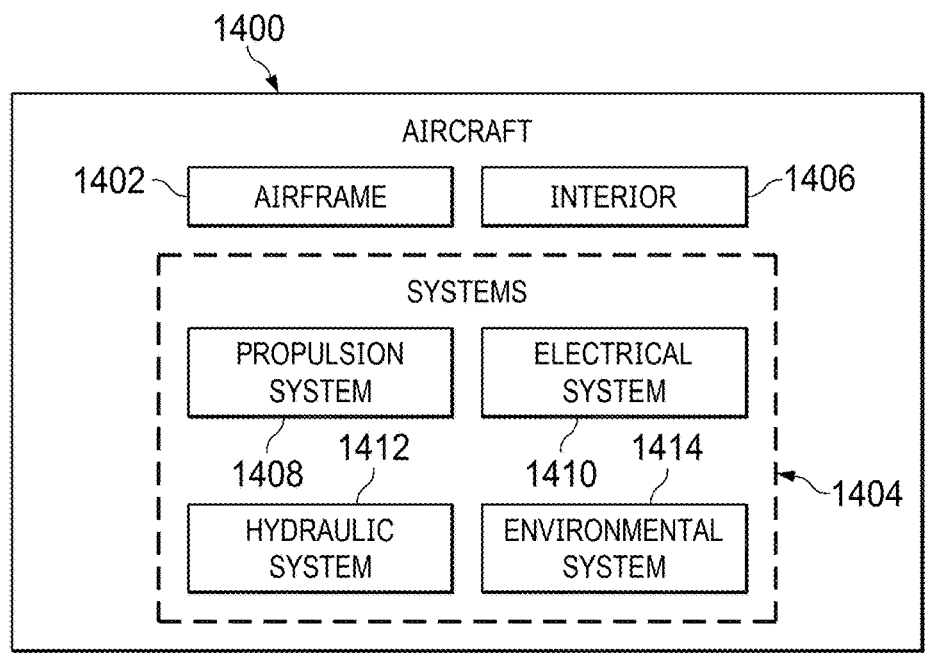
FIG. 14 is an illustration of a block diagram of an aircraft in which an illustrative embodiment may be implemented.

Illustrative embodiments of the disclosure may be described in the context of aircraft manufacturing and service method 1300 as shown in FIG. 13 and aircraft 1400 as shown in FIG. 14. Turning first to FIG. 13, an illustration of an aircraft manufacturing and service method is depicted in accordance with an illustrative embodiment. During pre-production, aircraft manufacturing and service method 1300 may include specification and design 1302 of aircraft 1400 in FIG. 14 and material procurement 1304.

During production, component and subassembly manufacturing 1306 and system integration 1308 of aircraft 1400 in FIG. 14 takes place. Thereafter, aircraft 1400 in FIG. 14 can go through certification and delivery 1310 in order to be placed in service 1312. While in service 1312 by a customer, aircraft 1400 in FIG. 14 is scheduled for routine maintenance and service 1314, which may include modification, reconfiguration, refurbishment, and other maintenance or service.

Each of the processes of aircraft manufacturing and service method 1300 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers; and an operator may be an airline, a leasing company, a military entity, a service organization, and so on.

With reference now to FIG. 14, an illustration of an aircraft is depicted in which an illustrative embodiment may be implemented. In this example, aircraft 1400 is produced by aircraft manufacturing and service method 1300 in FIG. 13 and may include airframe 1402 with plurality of systems 1404 and interior 1406. Examples of systems 1404 include one or more of propulsion system 1408, electrical system 1410, hydraulic system 1412, and environmental system 1414. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 1300 in FIG. 13. In one illustrative example, components or subassemblies produced in component and subassembly manufacturing 1306 in FIG. 13 can be fabricated or manufactured in a manner similar to components or subassemblies produced while aircraft 1400 is in service 1312 in FIG. 13. As yet another example, one or more apparatus embodiments, method embodiments, or a combination thereof can be utilized during production stages, such as component and subassembly manufacturing 1306 and system integration 1308 in FIG. 13. One or more apparatus embodiments, method embodiments, or a combination thereof may be utilized while aircraft 1400 is in service 1312, during maintenance and service 1314 in FIG. 13, or both. The use of a number of the different illustrative embodiments may substantially expedite the assembly of aircraft 1400, reduce the cost of aircraft 1400, or both expedite the assembly of aircraft 1400 and reduce the cost of aircraft 1400.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

As used herein, "a number of" when used with reference to items, means one or more items. For example, "a number of different types of networks" is one or more different types of networks. In illustrative example, a "set of" as used with reference items means one or more items. For example, a set of metrics is one or more of the metrics.

The description of the different illustrative embodiments has been presented for purposes of illustration and description and is not intended to be exhaustive or limited to the embodiments in the form disclosed. The different illustrative examples describe components that perform actions or operations. In an illustrative embodiment, a component can be configured to perform the action or operation described. For example, the component can have a configuration or design for a structure that provides the component an ability to perform the action or operation that is described in the illustrative examples as being performed by the component. Further, to the extent that terms "includes", "including", "has", "contains", and variants thereof are used herein, such terms are intended to be inclusive in a manner similar to the term "comprises" as an open transition word without precluding any additional or other elements.

Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A computer-implemented method for detecting foreign object debris (FOD), the method comprising:
    using a number of processors to perform:
    receiving images captured by a number of imaging devices in a defined inspection area;
    generating, by a pre-trained generative artificial intelligence (AI) model, a natural language text caption in complete sentences describing the images to enable easier interpretation of objects in the images, wherein the caption is newly generated and includes a position and condition of the objects in relation to their immediate surroundings in the images;
    classifying, by a text classifier AI model, FOD in the images based on the natural language text caption, and a confidence determination of whether FOD is present in the natural language text caption;
    identifying, by an explainable AI model, words and phrases within the natural language text caption according to which the text classifier AI model made the classification and the confidence determination of whether FOD is present in the natural language text caption; and
    displaying, in a user interface, a report including, for each identified FOD, a location where the FOD was identified in the inspection area, the captured image with the natural language text caption, and color coded highlighting of the key words and phrases identified by the explainable AI model to determine whether FOD is present in the natural language text caption.

2. The method of claim 1, wherein the images are captured by:
    receiving, from a tracking device, positional tracking data of a user moving through the defined inspection area; and
    directing the number of imaging devices along a path through the inspection area defined by the positional tracking data to capture the images.

3. The method of claim 2, wherein the tracking device comprises one of:
    a wrist tracker;
    a smart watch; or
    a handheld mobile device.

4. The method of claim 1, further comprising translating, by a generative AI language translation model, the natural language explanations into a specified second language.

5. The method of claim 1, wherein the imaging devices comprises at least one of:
    Simultaneous Localization and Mapping devices;
    drones; or
    static cameras.

6. The method of claim 1, wherein the captured images comprise at least one of:
    still images; or
    video.

7. The method of claim 1, wherein the explainable AI model comprises at least one of:
    a SHapley Additive explanations model;
    a Local Interpretable Model Agnostic Explanation model;
    tree surrogates;
    Global Interpretation via Recursive Partitioning;
    Explainable Boosting Machine; or
    Contrastive Explanation Method.

8. The method of claim 1, wherein the confidence determination of whether FOD is present in the natural language text caption comprises a determination of whether a confidence score of whether or not there is FOD in the images based on the natural language text caption is above a set threshold.

9. A system for detecting foreign object debris (FOD), the system comprising:
    a storage device that stores program instructions;
    one or more processors operably connected to the storage device and configured to execute the program instructions to cause the system to:
    receive images captured by a number of imaging devices in a defined inspection area;
    generate, by a pre-trained generative artificial intelligence (AI) model, a natural language text caption describing the images to enable easier interpretation of objects in the images, wherein the caption is newly generated and includes a position and condition of the objects in relation to their immediate surroundings in the images;
    classify, by a text classifier AI model, FOD in the images based on the natural language text caption, and a confidence determination of whether FOD is present in the natural language text caption;
    identify, by an explainable AI model, words and phrases within the natural language text caption according to which the text classifier AI model made the classification and the confidence determination of whether FOD is present in the natural language text caption; and
    display, in a user interface, a report including, for each identified FOD, a location where the FOD was identified in the inspection area, the captured image with the natural language text caption, and color coded highlighting of the key words and phrases identified by the explainable AI model to determine whether FOD is present in the natural language text caption.

10. The system of claim 9, wherein the images are captured by:
    receiving, from a tracking device, positional tracking data of a user moving through the defined inspection area; and
    directing the number of imaging devices along a path through the inspection area defined by the positional tracking data to capture the images.

11. The system of claim 10, wherein the tracking device comprises one of:
    a wrist tracker;
    a smart watch; or
    a handheld mobile device.

12. The system of claim 9, wherein the processors further execute instructions to translate, by a generative AI language translation model, the natural language explanations into a specified second language.

13. The system of claim 9, wherein the imaging devices comprises at least one of:
    Simultaneous Localization and Mapping devices;
    drones; or
    static cameras.

14. The system of claim 9, wherein the captured images comprise at least one of:

still images; or video.

15. The system of claim 9, wherein the explainable AI model comprises at least one of:

a SHapley Additive explanations model;

a Local Interpretable Model Agnostic Explanation model;

tree surrogates;

Global Interpretation via Recursive Partitioning;

Explainable Boosting Machine; or

Contrastive Explanation Method.

16. A computer program product for detecting foreign object debris (FOD), the computer program product comprising:

a non-transitory computer-readable storage medium having program instructions embodied thereon to perform the operations of:

receiving images captured by a number of imaging devices in a defined inspection area;

generating, by a pre-trained generative artificial intelligence (AI) model, a natural language text caption describing the images to enable easier interpretation of objects in the images, wherein the caption is newly generated and includes a position and condition of the objects in relation to their immediate surroundings in the images;

classifying, by a text classifier AI model, FOD in the images based on the natural language text caption, and a confidence determination of whether FOD is present in the natural language text caption;

identifying, by an explainable AI model, words and phrases within the natural language text caption according to which the text classifier AI model made the classification and the confidence determination of whether FOD is present in the natural language text caption; and displaying, in a user interface, a report including, for each identified FOD, a location where the FOD was identified in the inspection area, the captured image with the natural language text caption, and color coded highlighting of the key words and phrases identified by the explainable AI model to determine whether FOD is present in the natural language text caption.

17. The computer program product of claim 16, wherein the images are captured by:

receiving, from a tracking device, positional tracking data of a user moving through the defined inspection area; and directing the number of imaging devices along a path through the inspection area defined by the positional tracking data to capture the images.

18. The computer program product of claim 16, further comprising instructions for translating, by a generative AI language translation model, the natural language explanations into a specified second language.

19. The computer program product of claim 16, wherein the imaging devices comprises at least one of:

Simultaneous Localization and Mapping devices;

drones; or static cameras.

20. The computer program product of claim 16, wherein the captured images comprise at least one of:

still images; or video.

21. The computer program product of claim 16, wherein the explainable AI model comprises at least one of:

a SHapley Additive explanations model;

a Local Interpretable Model Agnostic Explanation model;

tree surrogates;

Global Interpretation via Recursive Partitioning;

Explainable Boosting Machine; or

Contrastive Explanation Method.

* * * * *